United States Patent [19]
Bhame et al.

[11] Patent Number: 5,911,117
[45] Date of Patent: Jun. 8, 1999

[54] SERVICE PROTECTION ENCLOSURE FOR AND METHOD OF CONSTRUCTING A REMOTE WIRELESS TELECOMMUNICATION SITE

[75] Inventors: William H. Bhame, Marietta; George Robert Cutler, Fulton County; Bassem Rustom, Lilburn; Robert L. Dick, IV, Atlanta, all of Ga.

[73] Assignee: PCS Solutions, LLC, Atlanta, Ga.

[21] Appl. No.: 08/950,170

[22] Filed: Oct. 14, 1997

Related U.S. Application Data

[63] Continuation of application No. 08/504,199, Jul. 19, 1995, Pat. No. 5,710,804.

[51] Int. Cl.$^6$ ............................................. H04B 1/38
[52] U.S. Cl. ............................................. 455/90; 379/457
[58] Field of Search ............................... 455/90; 379/428, 379/447, 457, 451, 453, 437, 440; 361/600, 601, 602, 614, 616, 679, 724

[56] References Cited

U.S. PATENT DOCUMENTS

| | | | |
|---|---|---|---|
| 4,371,757 | 2/1983 | Debortoli et al. | 174/60 |
| 4,631,353 | 12/1986 | Marks | 174/16.1 |
| 4,644,095 | 2/1987 | Bright et al. | 174/50 |
| 4,694,484 | 9/1987 | Atkinson et al. | 455/561 |
| 4,899,500 | 2/1990 | Miller et al. | 52/146 |
| 5,069,516 | 12/1991 | Kohy et al. | 385/147 |
| 5,134,644 | 7/1992 | Garton et al. | 379/39 |
| 5,136,463 | 8/1992 | Webster | 361/622 |
| 5,323,289 | 6/1994 | Longsdorf et al. | 361/111 |
| 5,633,926 | 5/1997 | Cannetti | 379/437 |
| 5,710,804 | 1/1998 | Bhame et al. | 455/90 |

*Primary Examiner*—Dwayne D. Bost
*Assistant Examiner*—Tracy M. Legree
*Attorney, Agent, or Firm*—Polster, Lieder, Woodruff & Lucchesi, LC

[57] ABSTRACT

A service protection enclosure (SPE) for a cellular telephone or other wireless telecommunications transceiver site is disclosed. The site has at least one antenna (3) which transceives communication signals, radio equipment for receiving and sending radio signals from and to the antenna, transmission means (37, 39) for connecting the radio equipment and the antenna so as to carry the signals therebetween, AC power service lines (47) for providing power to the site, and telephone lines (48, and/or 115) for connecting the site with a telephone or other communication network. The services protection enclosure comprises a cabinet (35) adapted to be secured to a suitable foundation (29), the cabinet having side walls (55, 57), a top (53), and at least one door (61 or 63) providing access to the interior of the cabinet. The cabinet houses an AC power distribution panel (101) and receives the AC service lines (47), the telephone lines (48), and the RF transmission means (37, 39). The interior of the cabinet has a plurality of separate compartments (73, 75, 77) therewithin including a first compartment (75) housing means for receiving the AC power service lines, a second compartment (77) for housing means (91) for terminating the radio equipment transmission means, and a third compartment (73) for housing means (114) for terminating the telephone lines within the cabinet (35). The service protection enclosure further has a single point grounding system (SPG) for grounding all components, services, and terminations within the service protection enclosure and within the radio equipment cabinet (31) to common ground potential (43).

4 Claims, 7 Drawing Sheets

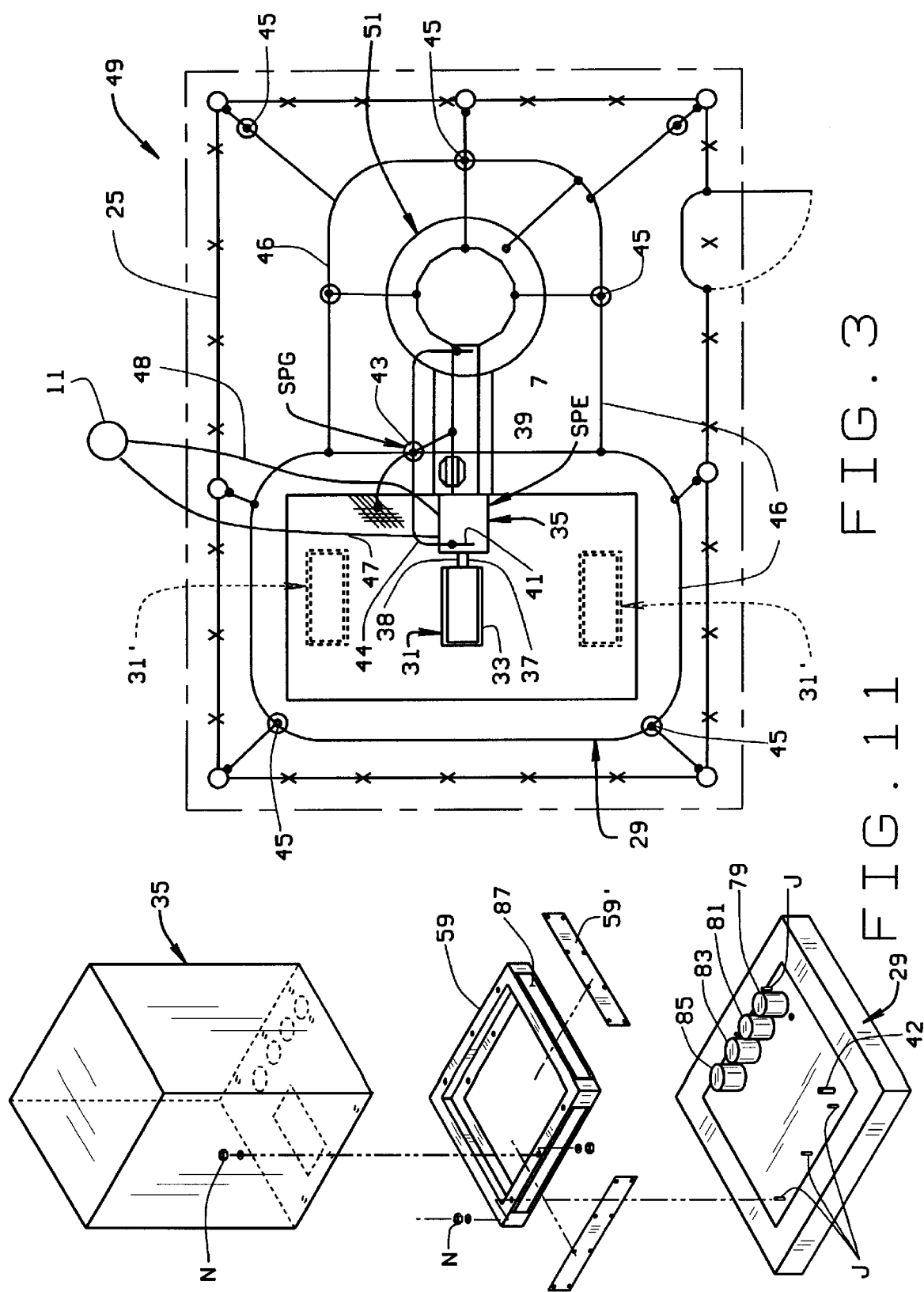

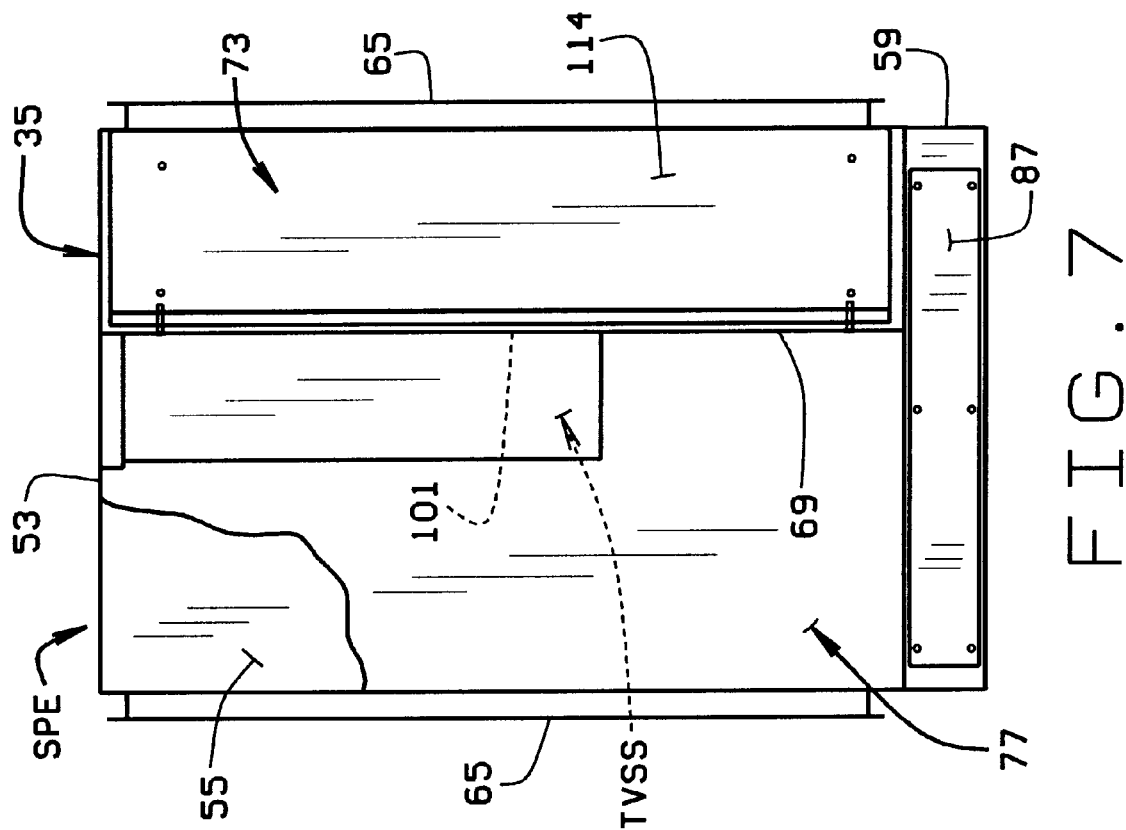
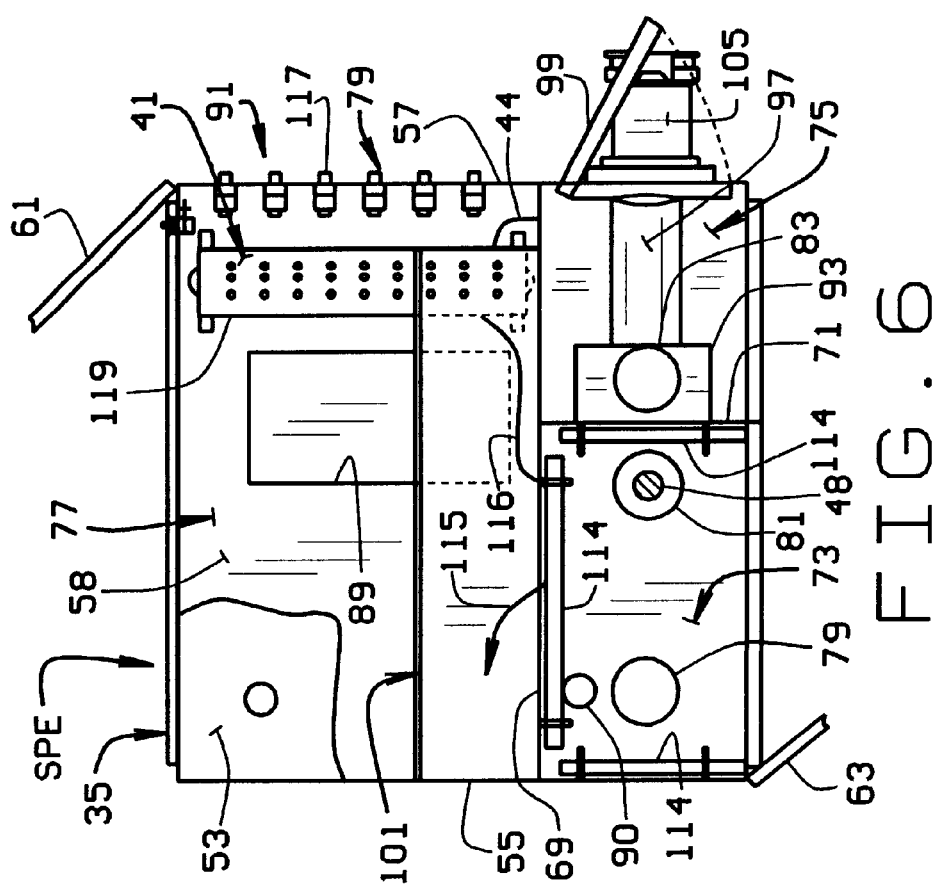

SERVICE PROTECTION ENCLOSURE FOR AND METHOD OF CONSTRUCTING A REMOTE WIRELESS TELECOMMUNICATION SITE

CROSS REFERENCE TO RELATED APPLICATION

This is a continuation of U.S. patent application Ser. No. 08/504,199, filed Jul. 19, 1995, now U.S. Pat. No. 5,710,804.

BACKGROUND OF THE INVENTION

This invention relates to an outdoor enclosure or cabinet (referred to as a service protection enclosure) to be installed during the construction of a remote wireless telecommunications site (e.g., a cellular telephone "cell site") or the like, for housing the AC (alternating current) power termination connections, AC power distribution panel and circuit breakers, for housing RF (radio frequency) transmission cable terminations, and for housing telephone equipment for the termination of the telephone lines (referred to as "telco" lines) leading to and from the site. Importantly, the service protection enclosure of the present invention provides single point grounding for protecting the radio equipment and RF, telco and AC power terminations within the enclosure from lightning strikes and low power voltage transient signals often present on the telco lines, AC power lines and on the RF cables that interfere with communications transmissions to and from the site. In this manner, all connections and lines to the radio equipment are provided with clean, filtered power or signals. This invention further relates to a method of constructing such a remote wireless telecommunications site utilizing a service protection enclosure, as above-described.

In recent years, there has been a rapid growth of the telecommunications and wireless communications industry. This rapid growth has meant that networks of wireless telecommunications transceiver sites have been constructed across the U.S. and around the world. This has been particularly true in the cellular telephone industry where cell sites must be constructed to provide a network of overlapping service areas by each cell site such that cellular service may be offered throughout the service area to be served by the network. Typically, a cell site will have a tall tower for supporting the antennas for the cell site. In addition, provision must be made at the cellsite for housing the radio equipment, for interconnecting the cellsite to the telephone or telco network, and for supplying AC power to the cell site. This has typically required the construction of a shelter at the cellsite to house this equipment and to provide an area where the various services may be connected with one another.

However, particularly in metropolitan areas, it is usually necessary to obtain approval under the zoning laws of the particular community in which the cell site is to be constructed. There has been considerable opposition to the construction of such cell sites, due primarily to the tall tower required and the utilitarian appearance of the shelter enclosing the necessary equipment at the cell site. It has thus been a long-standing problem of obtaining zoning approval for the construction of such cell sites.

In recent years, there has been a trend to house the radio equipment at the cell site in an outdoor equipment cabinet, with the other services (e.g., AC power and telco interconnections) housed in other outdoor cabinets. Generally, the cabinet used to house the radio equipment is too small to house the other equipment. While this trend of housing the equipment in separate enclosures or cabinets has eliminated the need for a shelter, it has resulted in multiple cabinets and it has increased the complexity of the construction process in installing the separate cabinets and the equipment therein, in interconnecting the equipment in the separate cabinets, and in providing adequate grounding in eliminating ground loop currents and voltages between the equipment in the separate cabinets.

There have, however, been safety and security concerns for housing all of the equipment jointly with the radio equipment in a single cabinet or enclosure. It is generally not good security or safety practice to allow power company personnel access to the radio equipment or to allow the telco personnel access to the AC power equipment. Further, there have been grounding problems and RF interference problems when the AC power terminations and the telco terminations were housed in close proximity to the radio equipment.

In addition, there has been a long-standing problem of how best to protect the equipment at such a cellsite from voltage surges, lightning strikes, and from transient voltages, and how to best protect this equipment from any currents that may flow across the terminals of the equipment caused by any difference in the grounding potentials between the remotely located equipment where such remotely located equipment is grounded to different points within the site.

In the construction of cell sites, prior to the present invention, there was typically a problem in scheduling different trades to perform their work at the cell site. Often, a trade (e.g., those craftsmen who connect the RF coax cables to the radio equipment) cannot perform their job at the site until other work (e.g., installation of the radio equipment in its cabinet) has been done. This is particularly true when the various equipment must be installed in different enclosures or within a shelter. Further, those skilled in this field will recognize that there may be long lead times required for certain equipment to be delivered to the site. Heretofore, these long lead time items (especially the radio equipment) would adversely impact the scheduling of the installation of the other equipment at the site.

SUMMARY OF THE INVENTION

Among the several objects and features of the present invention may be noted the provision of a single services protection enclosure for a telecommunications site which has terminations for the RF transmission cables or lines linking the radio equipment installed in another cabinet or in a shelter to the antenna on the tower, terminations for connecting AC power service lines leading to the site to the enclosure, and space within the services protection enclosure for terminating the telco lines to the enclosure such that once the service protection enclosure of the present invention is installed at the site, the various trades need only connect their respective service lines (e.g., AC service lines, telco lines, or RF transmission lines) to respective terminations provided within the services protection enclosure thereby to minimize scheduling of the various trades at the site during construction;

The provision of such a services protection enclosure which incorporates an integrated single point grounding system along with voltage filters and transient voltage surge suppression within the enclosure thereby to provide a common grounding potential, to minimize damage from lightning strikes at the site, to eliminate or minimize unwanted voltage surges, to insure that the radio equipment is provided with clean, filtered signals or power, and to insure that all of the equipment installed within the site is at the same potential so as to prevent unwanted transient currents across the terminals, and so as to insure that the radio equipment within the site only is subjected to the same filtered or "clean" signals;

The provision of such a services protection enclosure which provides secure compartments within the overall enclosure specially constructed to house an AC distribution panel, AC circuit breakers, AC terminations, telco termination panels, and radio equipment cabling terminations, and which provides for the ready termination and interconnection of the AC power service lines, the telco lines, and the RF cabling;

The provision of such a services protection enclosure which is pre-wired such that the single point grounding is in place within the enclosure when it is delivered to the construction site such that only one properly installed ground connection need be made to adequately ground the services protection enclosure and all of the equipment and terminals housed throughout the site to a single point on the site grounding system;

The provision of such a services protection enclosure which encloses separate and secure areas or compartments within the enclosure for housing the telco connections and terminations, the radio equipment terminations, and the AC power distribution panel and terminations in such separate secured areas such that personnel at the site may be selectively denied or permitted access to the equipment within the enclosure on an as needed basis thereby to provide security for the radio equipment and to prevent untrained personnel from inadvertently coming into contact with radio equipment;

The provision of such a services protection enclosure which is sufficiently large to enclose the AC circuit breakers and termination, radio equipment terminations, the telco communications, and other equipment that may be required (e.g., such as aircraft warning light controls and on-site storage of safety equipment);

The provision of such a services protection enclosure in which an AC watt-hour meter may be read without having to open the enclosure;

The provision of such a services protection enclosure which is less conspicuous and more aesthetically pleasing to surrounding property owners than prior cell site shelters or sites with multiple cabinets such that it may be easier to obtain zoning clearance for the construction of cell sites using the services protection enclosure of the present invention;

The provision of such a services protection enclosure which is adapted to be powered by an AC generator in the event of an emergency and which is provided with a mechanical interlock switch;

The provision of such a services protection enclosure which is of weather tight and rugged construction, which reduces site construction costs and maintenance costs, which is of economical construction, which conforms to applicable electrical codes, which is easy and economical to install, which allows equipment to be installed at the factory or shop instead of at the construction site, and which improves the service life and facilitates maintenance of the radio equipment and of the cell site; and The provision of a method of constructing a cell site or the like which involve the use of a services protection enclosure of the present invention such that the scheduling of construction activities at the site is independent of the schedule of the installation of the AC power lines to the site, of the installation of the telephone lines to the site, and/or of the delivery of the radio equipment to the site.

Briefly stated, this invention relates to a service protection enclosure for a cellular telephone or other wireless telecommunications transceiver site, the site having at least one antenna which transceives communication signals. The site further has radio equipment for receiving and sending radio signals from and to the antenna, transmission means for connecting the radio equipment and the antenna so as to carry the signals therebetween, AC power service lines for providing power to the site, and telephone (telco) lines for connecting the site with a telephone or other communication network. Still further, the services protection enclosure comprises a cabinet adapted to be secured to a suitable foundation and having side walls, a top, a back, and at least one door providing access to the interior of the cabinet. The cabinet receives the AC service lines, the telephone lines, and the RF transmission cables. The interior of the cabinet has a plurality of separate compartments therewithin including a first compartment housing an AC power distribution panel and having means for connection the AC power service lines to the AC power distribution panel, a second compartment for housing means for terminating the radio equipment transmission means, and a third compartment for housing means for terminating the telephone lines within the enclosure. Still further, the service protection enclosure has a single point grounding system for grounding the AC power distribution panel and circuit breakers, the radio equipment transmission means, and the telco termination means such that all components and terminations within the service protection enclosure are at a common ground potential.

The method of this invention relates to the construction a remote wireless telecommunications site or the like. The site has an antenna for transmitting and/or receiving wireless communications, radio equipment and radio frequency transmission cabling for sending and receiving the communications to and from the antenna, means for connecting the radio equipment to a telephone communications network including telephone lines servicing the site, and means for powering the site and the radio equipment, the powering means including AC service lines servicing the site. Importantly, the method of this invention is independent of the scheduling of the installation of the AC power services lines to the site, or to the installation of the telephone lines to the site, or of the installation of the radio equipment on the site. The method comprises the steps of installing a services protection enclosure at the desired location at the site. The service protection enclosure has AC service line termination means and an AC power distribution panel, telephone line termination means, and radio frequency transmission cabling termination means therein. The services protection enclosure further has a telephone termination compartment, and an AC service line termination compartment separate from the telephone termination compartment. The method further comprises the step of terminating the AC service lines to the AC termination means in the AC termination compartment of the service protection enclosure at such convenient time after the AC service lines are provided at the site. It will be noted that this is not dependent upon the prior or subsequent installation of any other equipment at the site. The method further involves terminating the radio frequency cabling in the services protection enclosure at a convenient time. The method further involves terminating the telephone lines within the telephone termination compartment of the services protection enclosure at such time as the telephone lines are provided at the site.

Other objects and features of this invention will be in part apparent and in part pointed out hereinafter.

BRIEF DESCRIPTION OF THE DRAWINGS

FIG. 3 plan view of another remote wireless telecommunications site having a monopole tower and a services protection enclosure of the present invention;

FIG. 6 is a top plan view of the services protection enclosure shown in FIG. 4 (with the doors shown partly open and cut away for clarity and with only a portion of the top wall of the cabinet shown) illustrating a partition extending from one side to the other and from top to bottom of the services protection enclosure generally dividing the interior of the services protection enclosure into two areas, namely a first area referred to as the RF termination compartment and a second area referred to as the telco and AC power termination compartment, with another partition dividing the second area into a telco compartment separate and apart from an AC power termination compartment;

FIG. 7 is a left side elevational view taken along line 7—7 of FIG. 4 illustrating the left elevation of the services protection enclosure with the major portion of the cabinet side wall broken away to show an AC power distribution panel located in the RF cable termination compartment and illustrating the telco compartment;

FIG. 11 (sheet 2) is an exploded perspective view of the services protection enclosure, its base ring, and the concrete pad on which the base ring is secured illustrating the preferred method of installing the service protection enclosure at the site.

Corresponding reference characters indicate corresponding parts throughout the several views of the drawings.

DESCRIPTION OF PREFERRED EMBODIMENTS

Figure 1:
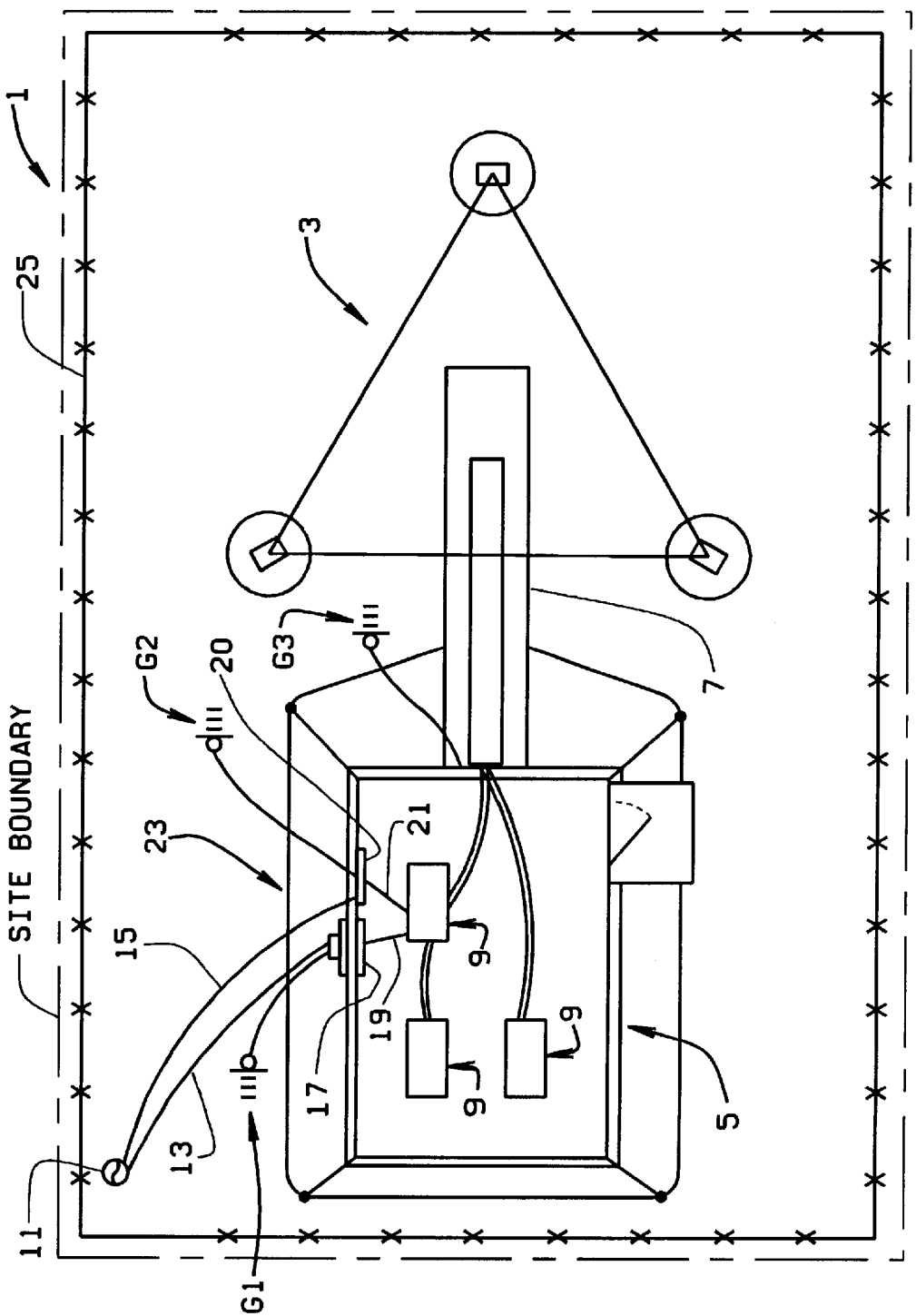
FIG. 1 is a plan view of a prior art remote wireless telecommunications site (e.g., a cellular telephone site) having a lattice antenna and a shelter for housing radio equipment, an AC power distribution panel, and telephone lines terminations within the shelter.

Referring now to the drawings and more specifically to FIG. 1, a prior art remote wireless telecommunications site, such as a cellular telephone antenna site, is indicated in its entirety by reference character 1. The site includes an antenna tower as generally indicated at 3. As shown in FIG. 1, antenna tower 3 is a lattice-type tower which may be of any desired height and supporting any of a wide variety of known wireless telecommunications antenna (not shown). The particular tower illustrated in FIG. 1 has a triangular cross section, but any tower shape or construction may be used. The site further has a shelter or equipment building, as generally indicated at 5, proximate the antenna tower and housing or enclosing the various equipment (as will appear) for use at the site. A weather protected cable tray or bridge 7 extends between shelter 5 and the tower 3 for carrying RF coaxial transmission cables (not shown in FIG. 1). Typically, this cable tray or bridge 7 is supported about eight (8) feet or so above grade level. The shelter houses radio equipment, as generally indicated at 9, of the type generally used at a wireless transceiver site for sending and receiving radio communications for a cellular telephone transceiver site or other wireless telecommunications site.

As is typical, a utility pole 11 is located at or near the site 1. The utility pole carries AC power service lines 13 and telephone line 15 (also referred to as "telco" lines). The AC service lines 13 supply AC power to the site, and the telco lines 15 link the radio equipment 9 within the shelter 5 to a telephone or other communications network. The AC service lines 13 terminate in an AC distribution panel 17 within shelter 5 and the distribution panel is connected to the RF equipment 9 by conductors 19 for powering the RF equipment. Likewise, the telco lines terminate with a respective telco termination panel 20 and are connected to the RF equipment by appropriate wiring 21 such that communications may be transmitted between the telco lines 15 and the RF equipment 9 whereby communications may be transceived by the RF equipment and transmitted to and from the telephone network in the manner well known to those skilled in the field. A multiple point grounding system 23 surrounds shelter 5 and grounds the various equipment and structures at the site to various grounding rods incorporated in the grounding system. More specifically, the multiple point grounding system 23 includes a first grounding rod G1 to which the AC power panel and terminations are grounded, a second ground rod G2 to which the telco terminations are grounded, and a third ground point G3 to which the radio equipment terminations and RF cabling terminations are grounded. As previously noted, such multiple point grounding systems were necessary because the various equipment and terminations were located in regions of the shelter or cell site remote from one another. These separate grounding rods could, under certain circumstances, have a somewhat different grounding potential from one another which could result in a difference in grounding potentials at different locations within the site. These differences in grounding potentials oftentimes resulted in the generation of unwanted ground loop currents and voltages.

Still referring to FIG. 1, the shelter 5 used with such prior art sites is relatively large (e.g., about 12 feet by about 18 feet). It, of course, has a roof (not shown) and is oftentimes air conditioned so as to protect the equipment therein. The overall size of such a prior art telecommunications site may be, for example, about 75 feet by about 75 feet.

Figure 2:
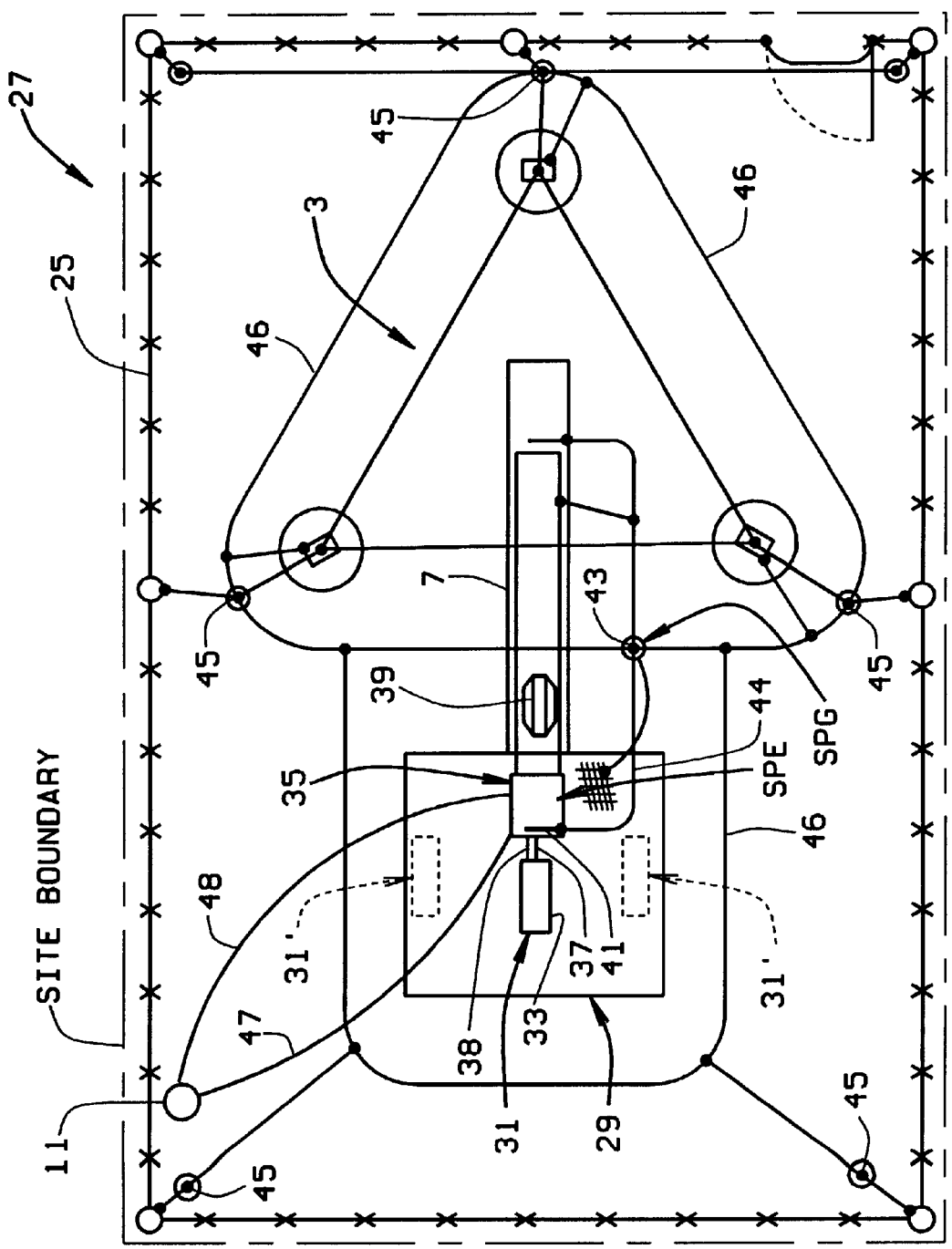
FIG. 2 is a plan view of a remote wireless telecommunications site having a lattice tower and a services protection enclosure of the present intention for housing the terminations of AC power to the site, terminations of telephone lines to the site and for termination of the RF connections between the radio equipment and the antenna on the tower with all of the equipment and terminations in the services protection enclosure being grounded to a single point.

Referring now to FIG. 2, a wireless telecommunications site of the present invention is indicated in its entirety by reference character 27. This site includes a concrete pad 29 poured adjacent tower 3. A so-called base transceiver station, as generally indicated at 31, is mounted on the pad. This base transceiver station includes a cabinet 33 for housing radio equipment therewithin thus eliminating the necessity of a shelter for the radio equipment, such as described above in regard to the prior art site 1. Preferably, but not necessarily, pad 29 is of sufficient size as to accommodate other base transceiver stations 31' (as shown in dotted lines in FIGS. 2 and 3) such that as the use of the site grows, additional capability may be readily added to the site so as to expand the use of the site for other types of wireless telecommunications.

As shown in FIGS. 2 and 3, site 27 of the present invention further includes a services protection enclosure, as generally indicated as SPE, for housing equipment (other than the radio equipment) that was formerly housed in shelter 5. In this manner, the services protection enclosure SPE of the present invention eliminates the need for a shelter for housing the equipment other than the radio equipment at the site. Of course, the SPE comprises a weatherproof cabinet 35 (as will be hereinafter described in detail) for housing the equipment. Radio frequency (RF) cabling 37, typically a group of small diameter coaxial cables, extends between the radio equipment housed within RF cabinet 33 and the services equipment enclosure cabinet 35. Preferably, RF cabling 37 is housed in a weather proof cable trough (not shown) extending between the RF equipment cabinet 33 and the service equipment enclosure 35. Further, other RF transmission cabling, as indicated at 39, is housed within the weather protected cable support structure 7 extending from the services protection enclosure and the tower 3 with this RF cabling 39 transmitting signals between the RF cabling 37 and the antennas on tower 3. Usually, cabling 39 is coaxial cable of a substantially larger diameter than cabling 37 linking the RF equipment and the services equipment enclosure cabinet 35. Further, AC power lines 38 and telephone interconnect lines 115 (as hereinafter described) from the services protection enclosure SPE are also carried in by the cable tray carrying RF cabling 37 with the AC power lines supplying power to the radio equipment.

In accordance with this invention, a single point grounding system, as indicated generally at SPG, is provided for grounding cabinet 35, all of the equipment within cabinet 35, for the radio equipment in radio equipment cabinet 33, and for other structures and equipment at the site 27, including additional base transceiver cabinets 31'' that may be added to the site at a later time. As shown in FIG. 2, a common or master grounding bus bar 41 is installed within the SPE to commonly ground all components and structure within the SPE. As will appear, all of the terminations, cabling, service panels, and structure of the SPE are grounded to master bus bar 41 by suitable grounding wires in the conventional manner well known to those skilled in the art. Upon installation of the services protection enclosure SPE at the site, only a single grounding rod 43 properly installed is required, and only one grounding wire, as indicated at 44, need be connected between bus bar 41 and grounding rod 43 thereby to insure that all of the equipment, all terminations, and all structure of cabinet 35 are properly grounded. Preferably, a grounding conduit, as indicated at 42 in FIG. 11, is provided in pad 29 to receive a common grounding wire 44 which connected to bus bar 41, routed through conduit 42, and connected to grounding rod 43. It will be understood that the radio equipment 31 in base transceiver cabinet 33 may be grounded to the single point grounding system SPG of the present invention by grounding the cabinet 31 and all of the equipment and terminations therein to a master bus bar (not shown) located within cabinet 31 and by connecting a suitable grounding wire to this master bus bar and by routing this grounding wire to the services protection enclosure SPE where it may be connected to master bus bar 41. In this manner, the equipment within cabinet 31 is grounded in the same manner as the structure of the services protection enclosure SPE and the equipment therein. Grounding rod 43 may be located outside of pad 29. The master ground bus bar 41 for the services protection enclosure SPE is preferably a commercially available bus bar, such as a model B544A027 sold by Erico Inc. of Solon, Ohio. Because of the single point grounding SPG system of the present invention, differences in grounding potential between the different types of equipment and services no longer have any substantial effect on the radio equipment which sees only one potential with decreased chances for ground loop currents.

The site 27 is further grounded against lightning strikes by a series of grounding rods 45 spaced around the tower 3 pad 29. These grounding rods are interconnected by a ground wire 46 buried underground and surrounding tower 3 and pad 29. All of the structures at the site are interconnected to the lightning grounding system including the security fence 25 and the like so as to provide an equipotential surface for personnel safety and to prevent flashovers in the event of a lightning strike at the site. Note, this lightning grounding system is separate from the single point grounding SPG system heretofore described for the services protection enclosure SPE of the present invention.

As with the prior art site 1 heretofore described, site 27 of the present invention has a utility pole 11 associated therewith carrying AC service lines 47 for supplying AC power (e.g., 220 volt, single phase power) to the site and carrying telco service lines 48 to the site for connecting the site to a telephone or other communications network. It will be understood that within the broader scope of this invention that it is not necessary to provide a utility pole 11 at the site. Instead, the AC service lines 47 and the telco lines 48 may be underground lines or the like fed into concrete pad 29 via conduits or chases formed-in-place within the pad in a manner as will be described in detail hereinafter.

Referring now to FIG. 3, an alternative site of the present invention is indicated in its entirety by reference character 49. This alternate site 49 is similar in construction and operation to site 27 heretofore described, except the antenna tower is shown to be a monopole tower 51 instead of the lattice tower illustrated in FIG. 2.

The services protection enclosure SPE of the present invention is best shown in FIGS. 4–7. As shown, the SPE cabinet 35 is made of suitable sheet metal or the like so as to provide weather and environmental protection to the equipment housed therein and provides security to the equipment. The cabinet has a top 53, and sides 55, 57 which are secured to a base ring 59 (see FIG. 4). A floor 58 is provided in the bottom of the cabinet above the base ring. The sides hingedly support a front door 61 and a rear door 63 which may be swung open (as shown in FIG. 6) to provide access to the equipment within cabinet 35. As viewed from the right and left sides (i.e., FIGS. 5 and 7, respectively), cabinet 35 includes a door frame 65 against which a respective door 61 or 63 sealingly mates with to provide a weathertight enclosure. Of course, a door seal gasket (not shown) may be carried on the inside face of the doors to sealingly mate with the mating surface of the door frame to aid in sealing. Optionally, drip hoods (not shown) may be secured to top 53 so as to extend out beyond the sides of the top above the tops of doors 61 and 63 so as to prevent rainwater or the like from directly impinging on the door seals. A door latch assembly, as indicated at 67 may be carried by the door frame so as to latch its respective door in its closed position. As will be appreciated, the door latch 67 may incorporate a security lock for securing the door in its closed position.

Figure 10:
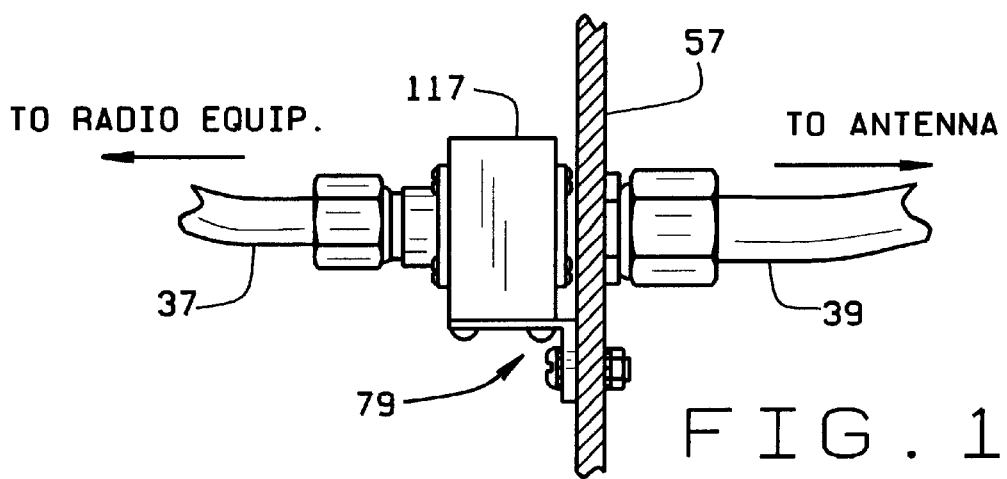
FIG. 10 is an enlarged view of a connector socket for interconnecting RF cabling from the RF equipment and the cabling leading to the antenna tower.

As shown best in FIG. 6, cabinet 35 has in interior partition 69 extending between the inner faces of cabinet sides 55 and 57. Further, the cabinet has another partition 71 extending perpendicularly from partition 69 toward rear door 63. Thus, partitions 69 and 71 define three compartments within cabinet 35, namely a telco termination compartment 73 which houses telco terminations (as will be hereinafter described), an AC service entrance compartment 75 (also referred to as the AC service line termination compartment) into which AC service lines 45 enter the service protection enclosure (as will be described), and an RF termination compartment 77 which houses means 79 (see FIGS. 6 and 10) for terminating RF cabling 37 which extends between the radio equipment in the RF equipment cabinet 33 and the RF cabling 39 which extends from the service protection enclosure and the antenna tower 3. Security lock 67 on door 63 isolates the telco compartment 73 and the AC service entrance compartment 75 so as prevent unauthorized service personnel from having access to these compartments and the equipment therein. In this way personnel are protected against accidental electrical shock and the security of both the telco terminations and the AC service connections is maintained. It will be appreciated that the front door 61 for cabinet 35 serves as the door for the RF termination compartment 77 and it too may be provided with a security lock.

As noted above, cabinet 35 has a base ring 59 which is secured to concrete pad 29 so as to solidly mount the SPE to the concrete pad. Those skilled in the art will recognize that the cabinet 35 may be mounted to the pad in a number of satisfactory ways, but a preferred manner of mounting is to provide the concrete pad with a plurality of J-bolts J (see FIG. 4) which are accurately positioned by means of a template T (see FIG. 11) such that upon pouring of the pad, the J-bolts are cast in place in the pad in a desired position to mate with holes in the base ring 59 which receive the J-bolts. Nuts N are threaded on the J-bolts so as to solidly mount the base ring to the pad (see FIG. 11).

Figure 4:
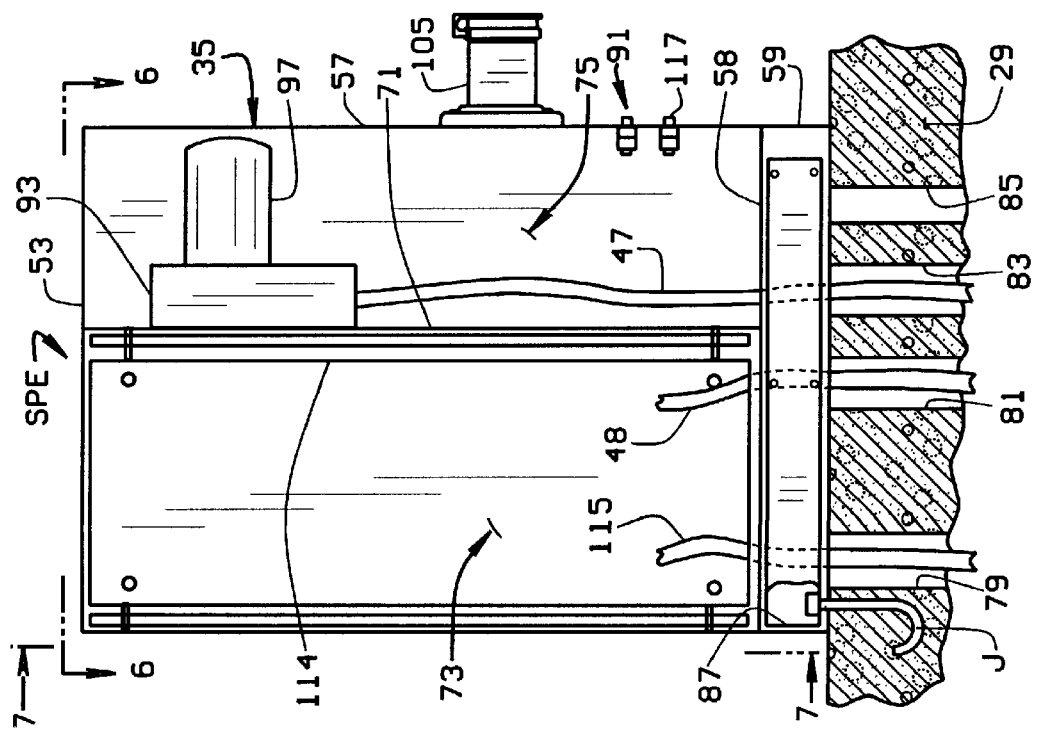
FIG. 4 is a front elevational view of the service protection enclosure installed on a concrete pad (shown in partial cross section) with its doors open so as to illustrate compartments or areas therein for housing telco terminations in a compartment separate from the AC power connections and the AC panel and separate from the RF cabling terminations between the radio equipment and the antenna, and for optionally housing safety equipment within the service protection enclosure.
Figure 8:
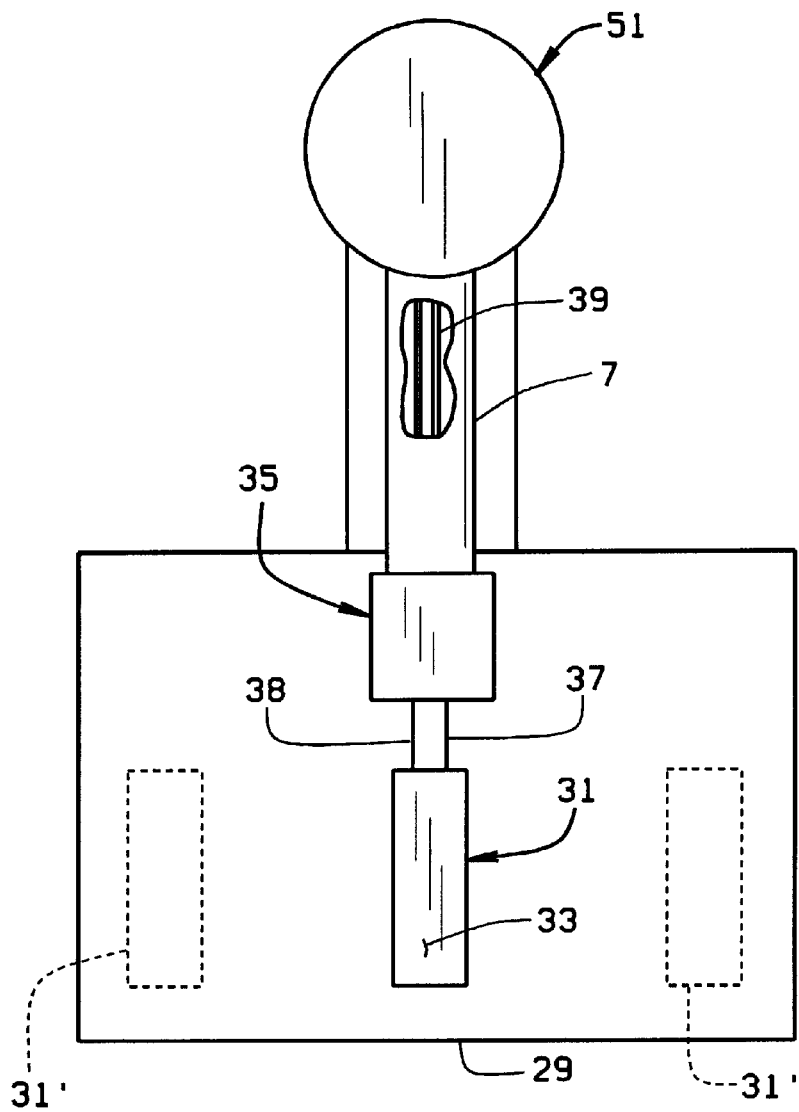
FIG. 8 semi-diagrammatic plan view of a portion of the site illustrating the services protection enclosure and its relating to a base transceiver station cabinet housing the radio equipment (and two possible future base transceiver station cabinets) and further illustrating a first covered cable tray between the base transceiver station and the services protection enclosure and second covered cable tray between the services protection enclosure and the cable ways leading up the tower to the antenna.

It is preferred that the AC service lines 47 and the telco lines 48 be routed underground to the SPE. In order to best accomplish this underground routing of the AC service lines and the telco lines, it is preferred (see FIG. 11) that the concrete pad be provided with conduits or chases 79, 81, 83 and 85 which receive the AC service lines 47 and the telco lines 48 and 115. These chases are set in place within the template T which forms the concrete pad 29 and are cast in place upon pouring of the pad. The above-noted template used to locate the position of J-bolts J in pad 29 and to locate chases 79, 81, 83 and 85 such that upon mounting of the SPE on the pad, the chases are in register with desired openings in the floor 58 of the SPE, as shown in FIG. 4. The chases extend up above the pad approximately seven inches so that they will extend above the level of base ring 59 and register with the conduit openings in the floor 58 of cabinet 35 such that the AC service lines 47 and the telco lines 48 exit their respective chases in register with their intended compartments within the cabinet 35. As noted above, pad 21 is preferably provided with a conduit 42 for receiving the grounding wire for connecting the master ground bus bar 41 and the single point grounding rod 43.

As previously noted, RF transmission cabling 37 extends between RF equipment cabinet 33 and the SPE. These RF cables may be carried in the above-described RF cable trough (not shown) extending between the RF equipment cabinet 33 and the SPE. Preferably, these RF cables 37 enter the SPE via a opening 87 in the side of base ring 59 (see FIG. 4) in the side of the base ring toward RF cabinet 33. This RF cabling 37 extends within base ring 59 and extends upwardly through an opening 89 (see FIG. 6) in the floor 58 of cabinet 35 into RF termination compartment 77 to an RF termination panel 91. As perhaps is best shown in FIG. 11, base ring 59 is provided with removable access panels 59" which when removed enable the RF cabling to be routed into the base ring. Preferably, knock out plates (not shown) may be provided in panel 91 which, upon installation of the SPE at the site, may be selectively punched out as required so as to accommodate the cables. As indicated at 90 in FIG. 6, an opening may be provided in the floor 58 within telco termination compartment 73 so that relatively small diameter radio equipment/telephone lines 115 may be run from the compartment 73, into the base 59 and then from the SPE to the RF equipment within the BTS cabinet.

Figure 5:
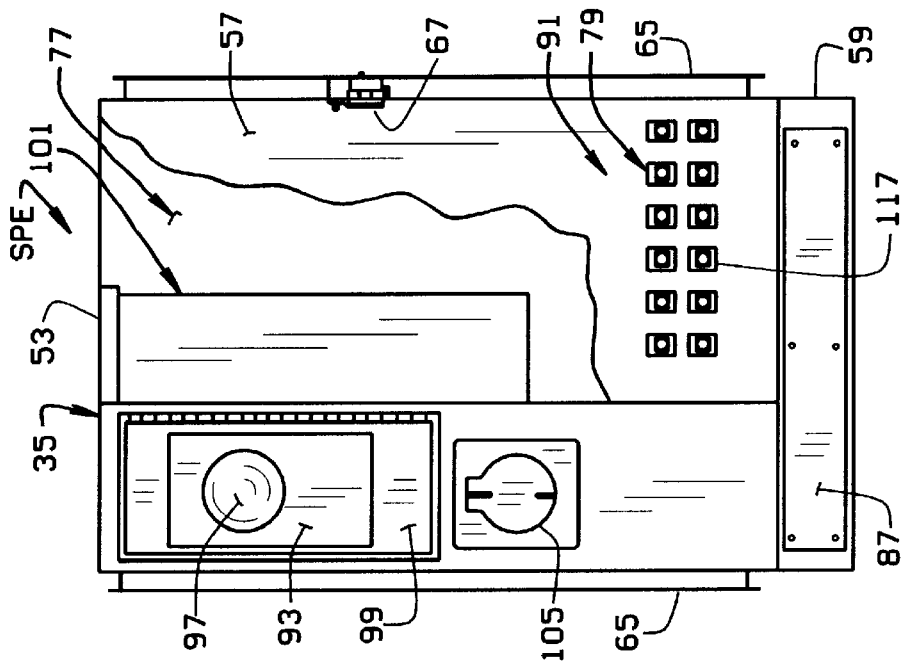
FIG. 5 is a right side elevational view of the services protection enclosure shown in FIG. 4 illustrating a utility meter cabinet for housing a watt-hour meter for metering the AC power supplied to the site, for housing a generator plug, and further illustrating RF coaxial cable connectors for enabling RF cabling between the antenna on the tower to be connected to the services protection enclosure and enabling RF cabling from the radio equipment housed in a separate enclosure to be connected to the services protection enclosure.

As shown best in FIGS. 4–6, a power meter base 93 is provided within AC service entrance compartment 75. This meter base 93 has a conventional meter socket 95 (see FIG. 9) for receiving a conventional watt-hour meter 97. Preferably, a transparent access door 99 is provided (see FIG. 6) so as to permit a meter reader to view and to read the watt-hour meter 97 through the door without having to open the access door. Of course, access door 99 may be opened so as to enable access to the meter by power company personnel or the like by using a coin or a screwdriver to open the access door.

As best shown in FIGS. 5–7, the AC power system included within the SPE further includes an AC power distribution panel and load center, as generally indicated at 101, located within the RF termination compartment 77 and accessible by opening front door 61 of cabinet 35. It will be understood that if the size of the service protection enclosure of this invention is sufficiently large, the load panel 101 may be located within the AC service line entrance compartment 75.

Load center 101 comprises a number of circuit breakers 103 (see FIG. 9) for supplying AC power to the various components at the site, such as the RF equipment, lighting, monitoring systems and the like. Preferably, load center 101 is AC power main distribution panel for single phase, 3 wire, 200 Amp, 120/240 volt, single phase service with a minimum of 12 branches or circuit breakers. A 24 position load center is preferred. This load panel is commercially available from Square D and a model NQOD42L225 is preferred. Of course, those skilled in the art will recognize that numerous other load center panels may be used in place of the above-noted Square D panel. The various circuit breakers in panel 101 may be connected to power conductors 38 which supply AC power to the radio equipment located in cabinet 33.

In many applications, it is desirable that the telecommunications site 27 be provided with a means for powering the site in the event power is not available from the power company over the AC service lines 47. Accordingly, it is typical to provide the site with means for enabling an emergency generator to supply the site with AC power. This is accomplished by providing the SPE with a receptacle 105 to which such an emergency AC generator (not shown) may be readily connected to the load distribution panel 101 in the same manner as power is supplied by the AC service lines. Preferably, receptacle 105 is a 200 amp, 3 wire 4 pole receptacle with a spring loaded cover or door. The load center is provided with a manual transfer switch for switching between AC power supplied by service lines 47 and the emergency generator so as to provide a transfer point between commercial AC power via service lines 47 and emergency generator power. In addition, main disconnect switches 109 and 111 are respectively provided on the panel for disconnecting the AC power supplied either by the service lines or by the emergency generator. Preferably, the transfer switch has a walking beam mechanical interlock to assure that both switches 109 and 111 can be in the off position, but both switches cannot both be on. One or more fluorescent or other lighting fixtures 112 (see FIG. 9) may be mounted within cabinet 35 for providing service personnel with adequate lighting for working on the equipment and components within the SPE. In addition, two 110 volt ground fault interrupter outlets or receptacles 113 may be provided into which service personnel may power their service tools.

Referring now to FIG. 6, telco line termination panels 114 are mounted within telco termination compartment 73 so that telco termination racks (not shown) may be readily mounted within compartment 73 such that conductors from telco service lines 48 entering the SPE via chases 79 or 81 installed in concrete pad 29 may be terminated within the SPE and properly interconnected to an interface between the telco lines and the radio equipment within RF equipment cabinet 33. In addition, radio equipment-telephone connection lines 115 (see FIGS. 4 and 6) exit telco termination compartment 73 via opening 90 in SPE floor 58, and side openings 87 in the base ring 59 so as to be connected to the RF equipment located remotely in cabinet 33. In this manner, the radio equipment is connected to the telephone network to which the telco service lines 48 and/or 115 are connected.

Further, AC power lines 38 are connected to load panel 101 for supplying AC power to the radio equipment in cabinet 33 with these AC power lines exiting cabinet 35 through appropriate openings (not shown) in cabinet floor 58.

In accordance with this invention, a ground wire 116 (see FIG. 6) is provided in compartment 73 so that the terminations of telco service lines 48 and the RF connection lines 115 may be grounded to master ground bus bar 41 so as to accomplish single point grounding for these terminations. A transient voltage surge suppression system, as indicated at TVSS, may be located within telco termination compartment 73 and is also grounded to the master grounding bus bar 41 by ground wire 116.

Referring now to FIGS. 4–6 and 10, RF termination panel 91 comprises a plurality of surge protectors/termination connectors 117 are shown for terminating RF cables 37 between the SPE and the RF equipment in the RF equipment cabinet 33 and for terminating the RF cabling 39 leading between the SPE and the antenna carried by tower 3. It will be appreciated that cabling 37 is typically of a smaller diameter than coax cabling 39. Connectors 117 installed on side wall 57 of cabinet 35 thus constitute means for terminating cabling 37 and 39 and for interconnecting these cables to one another. Preferably, connector 117 is a surge protector/termination plug commercially available from Polyphaser Corporation of Minden, N.J. which protects against up to 50 KVA transient currents. These plugs also provide DC blocked protection to the incoming coaxial cables. Optionally, quarter wave surge protectors (not shown) may be substituted for connectors 117. These quarter wave surge protectors protect the incoming cables at broad band frequencies ranging from 400 MHz to 3 GHz and all frequencies other than the operating frequency are filtered out and are diverted to ground via site master bus bar 41 to the single point grounding rod 43. In this manner, clean, filtered signals are insured for the RF radio equipment. It will be appreciated by those skilled in the art that connectors 117 may be readily grounded to the single point grounding system SPG by connecting a grounding wire (not shown) to each of the connectors and to bus bar 41. A waterproof jacket or sleeve (not shown) is placed over the connector 117 to further weather proof the connection.

Figure 9:
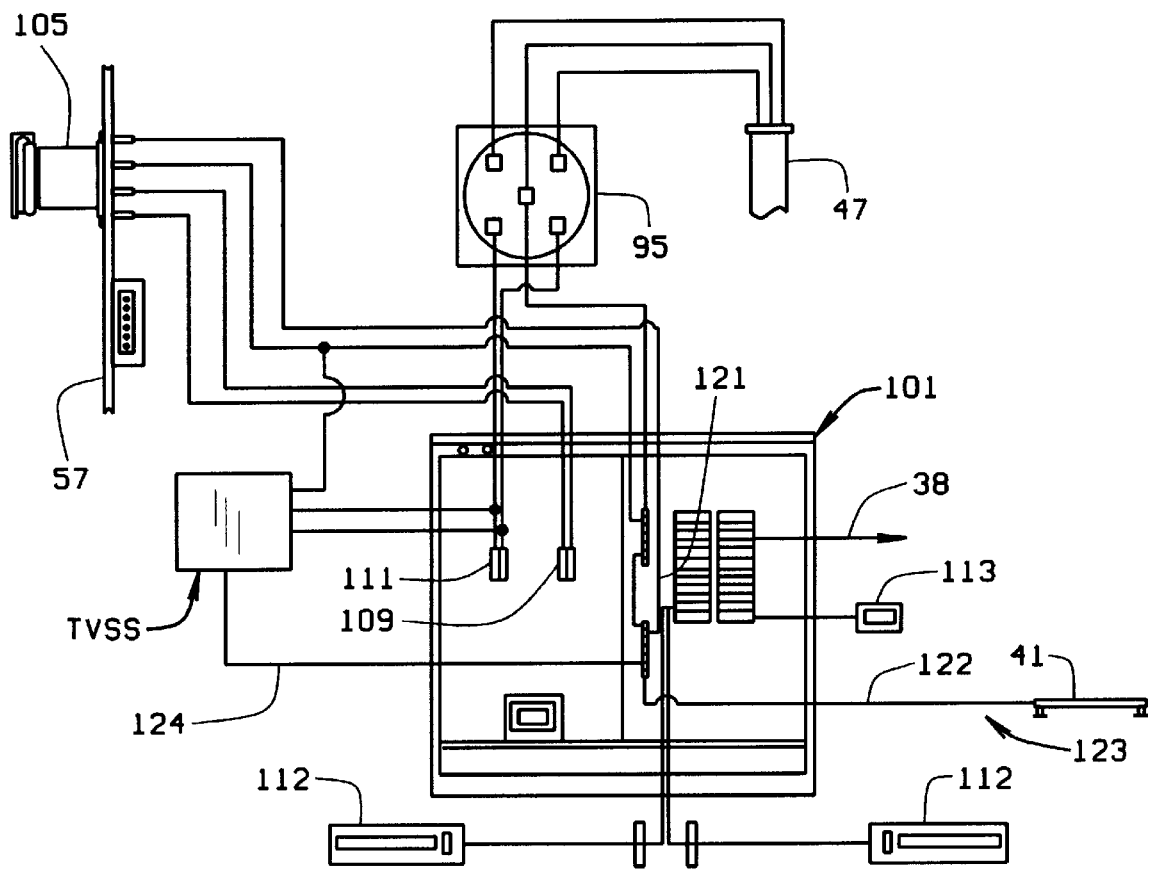
FIG. 9 is a circuit diagram illustrating the connection of AC services lines via a watt-hour meter to an AC service panel and further illustration a generator receptacle which may be connected to an electrical generator for powering the AC service panel in the event power is not available from the AC service lines, with the AC service panel having switches for transferring the supplying of power between the AC service lines and an emergency AC generator.

Referring to FIG. 9, load panel 101 is provided with a neutral ground bond, as is indicated at 121, which in turn is connected to master ground bus bar 41 by a suitable grounding wire 122. As previously described, bus bar 41 is electrically connected to ground rod 43 (see FIG. 2) in accordance with the National Electrical Code (NEC) code requirements.

In accordance with this invention, ground bus bar 41 is solidly mounted to cabinet 35 in such manner that all regions of the cabinet are electrically grounded to the bus bar. Further, means, as indicated at 123, is provided for electrically grounding all terminals and components within all of the compartments within housing 35 to the master ground bus bar 41. This grounding means may, for example, comprise copper grounding wires (which may be similar to grounding wires 116 and 122 heretofore described) extending between the component(s) to be grounded and the ground bus bar 41 with the grounding wires electrically secured to both the component to be grounded and the ground bus bar.

Still further in accordance with this invention, it will be understood that the cabinet 33 and the radio equipment therein may also be grounded to the single point grounding system SPG of the present invention by connecting all of the equipment within cabinet 33 and the cabinet itself to a master ground bus bar therein (not show) and by connecting this master ground bus bar to grounding rod 43 by means of a suitable grounding wire (not shown). Likewise, base receiving stations 31″ may be likewise grounded via the single point grounding system of the present invention in the same manner as described regarding the services protection enclosure.

Further, service protection enclosure SPE, and more specifically load panel 101, includes a transient voltage suppression system therewithin. This transient voltage suppression system, as generally indicated at TVSS (see FIGS. 7 and 11) may, for example, be a 120/240 VAC, 50–60 Hz, 3 wire transient voltage surge protector, such as a model 1265-88 commercially available from Joslyn Electronic Systems Corporation of Spokane, Wash. Preferably, the transient voltage suppression system is installed in load panel 101 and is connected with the shortest possible leads to the voltage lines and neutral at the main disconnect for commercial AC power. This voltage surge protector protects the incoming AC power from lightning transients and switching surges. As shown in FIG. 9, the transient voltage suppression system TVSS is grounded to the single point ground SPG by means of a grounding wire 124.

It will be appreciated that there is an advantage to providing surge suppression in the service protection enclosure SPE of the present invention rather than in the BTS cabinet 31 as had heretofore been conventional in that the services protection enclosure is physically separate from the BTS cabinet to as to protect the BTS cabinet and the radio equipment housed therein from unwanted electromagnetic coupling.

Those skilled in the art will appreciate that the services protection enclosure of the present invention may be provided with optional equipment and features. For example, doors 61 and 63 may be provided with door alarms which will alert a central security monitoring station if unauthorized persons open the doors. In addition, a fold down work table (not shown) may be incorporated in the SPE (preferably on the inside of the door 63) so that service personnel may conveniently work on equipment within the SPE. Further, a tower light control enclosure may be mounted on a side wall 55 or 57 of the SPE. This tower light enclosure may house a controller and a power supply for aircraft warning strobe lights mounted on the antenna tower 3.

The method of this invention relates to the construction a remote wireless telecommunications site 27 or 49. The site has an antenna 3 or 51 for transmitting and/or receiving wireless communications. The site further has radio equipment (which may be located in a BTS cabinet 31) and radio frequency transmission cabling 37, 39 for sending and receiving the communications to and from the antenna. In addition, means (e.g., telco termination panels 114 and connection lines 115) is provided for connecting the radio equipment to a telephone communications network including telephone lines 48 servicing the site. Still further, the site may include means (e.g., AC power lines 47 or an AC generator supplying AC load panel 101) for powering the site and the radio equipment. As shown in FIGS. 2 and 3, the powering means including AC service lines 47 servicing the site. Importantly, the method of this invention is independent of the scheduling of the installation of the AC power services lines 47 to the site, or of the scheduling of the installation of the telephone lines 48 to the site, or of the scheduling of the installation of the radio equipment on the site.

The method comprises the steps of installing a services protection enclosure SPE at a desired location (e.g., on pad 29) at the site. The service protection enclosure has AC service line termination means (e.g., power meter base 95) and an AC power distribution panel 101, telephone line termination means 114, and radio frequency transmission cabling termination means 79 therein. The services protection enclosure further has a telephone termination compartment 73, and an AC service line termination compartment 75 separate from the telephone termination compartment.

The method further comprises the step of terminating the AC service lines 47 to the AC termination means 95 in the AC termination compartment of the service protection enclosure at such convenient time after the AC service lines are provided at the site. It will be noted that this is not dependent upon the prior or subsequent installation of any other equipment at the site. The method further involves terminating the radio frequency cabling 37, 39 in the services protection enclosure at such convenient time as the radio equipment and/or the antenna are available. And the method involves terminating the telephone lines 48, 115 within the telephone termination compartment 73 of the services protection enclosure at such time as the telephone lines are provided at the site.

Those skilled in the art will recognize that in the construction of a cell site of the like using a services protection enclosure of the present invention substantially frees the construction process from many scheduling problems. At an early stage of the construction process, the services protection enclosure SPE is installed on its pad 29. Then, as the AC service lines are available at the site, the service lines need merely be connected to the power meter base 95. This then connects the prewired load panel 101 to the AC power. Likewise, whenever in the construction process the telephone service lines 48 become available, the telephone line termination panels 114 are available such that work can be carried out to terminate the telephone lines to the lines 115 connecting the radio equipment to the telephone lines. Again, this is independent of when in the construction process the telephone lines become available or when the radio equipment is delivered to the site. Because of the single point grounding system SPG of the present invention, it is insured that as these various components are installed at the site, they will be properly grounded in such manner as to best eliminate or minimize the effects of differences in grounding potentials which in turn eliminate unwanted ground loop currents or other unwanted transient voltages or currents from affecting the performance of the radio or telephone signals.

In view of the above, it will be seen that the several objects and features of this invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A service protection enclosure for installation at a cellular telephone or other wireless telecommunication site comprising a cabinet being adapted to be installed at the site, said site having an antenna and radio frequency equipment for sending and receiving signals to and from said antenna via radio frequency service lines, said cabinet having side walls, a top, and at least one door providing access to the interior of said cabinet, said cabinet receiving telephone lines linking said radio frequency equipment to a telephone network and RF service lines linking said radio frequency equipment to said cabinet and linking said cabinet to said antenna, the interior of said cabinet having at least two separate compartments therewithin including a first compartment for housing termination panels for terminating said telephone lines and a second compartment for terminating said radio frequency lines, said telephone lines and said radio frequency lines being connected to a single point grounding system for grounding of said telephone lines and said of radio frequency lines to common ground potential.

2. A service protection enclosure as set forth in claim 1 wherein said wireless telecommunications site is supplied with power from AC power service lines, said cabinet further receiving said AC power service lines, said AC power service lines being grounded by said single point grounding system so as to have a common ground potential relative to said telephone lines and said radio frequency lines.

3. A service protection enclosure (SPE) for installation at a cellular telephone or other wireless telecommunication transceiver site (27), said site having at least one antenna (3) which transceives communication signals, AC power service lines (47) for providing power to said site, and telephone lines (48) for connecting said site with a telephone or other communication network, said service protection enclosure comprising a cabinet (35) having side walls (55, 57), a top (53), and at least one door (61 or 63) providing access to the interior of said cabinet, said cabinet housing an AC power distribution panel (101), said cabinet receiving said AC power service lines (47) and said telephone lines (48), the interior of said cabinet having at least two separate compartments (73, 75) therewithin including a first compartment (73) for housing telephone terminations (114) and a second compartment (75) for housing said AC power distribution panel, said components and terminations within said service protection enclosure being grounded to common ground potential (43).

4. A service protection enclosure as set forth in claim 3 wherein said site has radio equipment (31) for receiving and sending radio signals from and to said antenna (3), radio frequency transmission lines (37, 39) for connecting said radio equipment and said antenna to as to carry said signals therebetween, and wherein said cabinet further has another compartment (77) for housing radio frequency transmission line terminations (79), said radio frequency transmission line terminations also being grounded to said common ground potential.

* * * * *